United States Patent
Larson et al.

(10) Patent No.: US 9,448,615 B2
(45) Date of Patent: *Sep. 20, 2016

(54) MANAGING POWER SAVINGS IN A HIGH AVAILABILITY SYSTEM AT A REDUNDANT COMPONENT LEVEL OF GRANULARITY

(71) Applicant: INTERNATIONAL BUSINESS MACHINES CORPORATION, Armonk, NY (US)

(72) Inventors: Chad J. Larson, Austin, TX (US); Manjunath B. Muttur, Bangalore (IN); Daniel G. Thornton, Rochester, MN (US); Deepti Umarani, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/476,946

(22) Filed: Sep. 4, 2014

(65) Prior Publication Data
US 2016/0041601 A1    Feb. 11, 2016

Related U.S. Application Data

(63) Continuation of application No. 14/456,115, filed on Aug. 11, 2014.

(51) Int. Cl.
*G06F 1/32* (2006.01)
*G06F 11/20* (2006.01)

(52) U.S. Cl.
CPC ............ *G06F 1/3287* (2013.01); *G06F 11/20* (2013.01); *G06F 11/2033* (2013.01)

(58) Field of Classification Search
CPC .......... G06F 1/28; G06F 1/30; G06F 1/3206; G06F 11/3058
USPC ........................................... 714/22
See application file for complete search history.

(56) References Cited

U.S. PATENT DOCUMENTS 7,174,471 B2  2/2007  Komarla et al.
7,730,365 B1  6/2010  Belady et al.
(Continued)

FOREIGN PATENT DOCUMENTS

WO    2013095505    6/2013

OTHER PUBLICATIONS

"PowerHA System Mirror", dated Feb. 5, 2014, accessed online from <https://www.ibm.com/developerworks/community/wikis/home?lang=en#!/wiki/Power%20Systems/page/High%20Availability> as of Feb. 10, 2014, 3 pages.

(Continued)

*Primary Examiner* — Chae Ko
(74) *Attorney, Agent, or Firm* — Amy J. Pattillo; Joseph Petrokaitis

(57) ABSTRACT

Based on a current activity running on a first selection of components operating in a primary mode from among redundant components within a high availability system, a separate power setting is selected for each separate type of redundant component from among the types of redundant components within the redundant components as specified in a high availability status specified for the current activity. At least one controller interface is called with a request to set the powered state of a particular component that is redundant to at least one of the first selection of components, from among a second selection of components operating in a standby mode from among the redundant components, to the separate power setting for the separate type of redundant component.

6 Claims, 9 Drawing Sheets

(56) References Cited

U.S. PATENT DOCUMENTS

| | | | |
|---|---|---|---|
| 7,861,098 B2 | 12/2010 | Theocharous et al. | |
| 8,108,514 B2 | 1/2012 | Coffey et al. | |
| 8,214,661 B2 | 7/2012 | Cooper et al. | |
| 8,397,088 B1* | 3/2013 | Ghose | G06F 1/206 713/300 |
| 8,417,973 B2 | 4/2013 | Cooper et al. | |
| 8,484,495 B2 | 7/2013 | Boyd et al. | |
| 8,589,721 B2 | 11/2013 | Gardelegen et al. | |
| 8,595,545 B2 | 11/2013 | Gardelegen et al. | |
| 8,631,411 B1* | 1/2014 | Ghose | G06F 1/206 361/676 |
| 2005/0132239 A1 | 6/2005 | Athas et al. | |
| 2007/0183444 A1 | 8/2007 | Schoettle | |
| 2008/0104430 A1* | 5/2008 | Malone | G06F 1/3203 713/300 |
| 2008/0304606 A1* | 12/2008 | Swoboda | G06F 11/267 375/356 |
| 2009/0138734 A1* | 5/2009 | Uchida | G06F 1/266 713/310 |
| 2010/0202924 A1* | 8/2010 | Degroot | H02M 7/003 422/62 |
| 2010/0275047 A1* | 10/2010 | Kaneko | G06F 1/3203 713/323 |
| 2012/0137172 A1* | 5/2012 | Gardelegen | G06F 1/3206 714/14 |
| 2012/0226918 A1 | 9/2012 | Rallo | |
| 2012/0246491 A1 | 9/2012 | Dain | |
| 2013/0039481 A1* | 2/2013 | Garaschenko | H04M 3/24 379/102.04 |
| 2013/0054788 A1* | 2/2013 | Corddry | H04L 43/0817 709/224 |
| 2013/0097369 A1* | 4/2013 | Talagala | G06F 12/0246 711/103 |
| 2013/0132759 A1* | 5/2013 | Lathrop | G06F 11/3062 713/340 |
| 2014/0129672 A1* | 5/2014 | Singh | H04W 72/0446 709/217 |
| 2014/0142777 A1* | 5/2014 | Dawidczak | G05B 19/41845 700/295 |
| 2015/0192979 A1* | 7/2015 | Ghose | G06F 1/206 713/320 |
| 2015/0280493 A1* | 10/2015 | Cha | H02J 7/0068 307/64 |

OTHER PUBLICATIONS

"High Availability, Load Balancing and Power Management", Oracle, accessed online from <http://docs.oracle.com/cd/E27300_01/E27309/html/vmusg-ovm-ha-load-power.html> as of Feb. 10, 2014, 1 page.

"Chapter 6, High Availability Scenarios", Red Hat, copyright 2014, accessed online from <https://access.redhat.com/site/documentation/en-US/Red_Hat_Enterprise_Virtualization/3.1/html/Evaluation_Guide/Evaluation_Guide-High_Availability.html> as of Feb. 10, 2014, 4 pages.

"VMWare Distributed Power Management Concepts and Use", copyright VMware Inc., accessed online from <http://www.vmware.com/files/pdf/Distributed-Power-Management-vSphere.pdf> as of Feb. 10, 2014, 18 pages.

Llopis et al, "Survey of energy-efficient and power-proportional storage systems", The Computer Journal, Apr. 10, 2013, 17 pages.

"Power Hypervisor (PHYP) problems", accessed online from <https://publib.boulder.ibm.com/infocenter/bladectr/documentation/index.jsp?topic=/com.ibm.bladecenter.ps700.doc/ps700_r_phyp.html> as of Jul. 1, 2014, 1 page.

"HOWTO: Implement SEA Failover", accessed online from <http://www.rootvg.net/content/view/436/88/> as of Jul. 1, 2014, 5 pages.

U.S. Appl. No. 14/456,115, filed Aug. 11, 2014, in re Larson, 51 pages.

Office Action, dated Mar. 4, 2016, U.S. Appl. No. 14/456,115, dated Aug. 11, 2014, In re Larson, 44 pages.

Notice of Allowance, dated Jul. 1, 2016, U.S. Appl. No. 14/456,115, dated Aug. 11, 2014, In re Larson, 22 pages.

* cited by examiner

| ACTIVITY SELECTIONS 108 | |
|---|---|
| ACTIVITY LIST 302 | HA NUMBER LIST 304 |
| LOW PRIORITY SYSTEM ADMIN JOBS 310 | 00111110 |
| CONFIGURATION CHANGES 312 | 00100111 |
| HARDWARE MAINTENANCE OPERATIONS 314 | 00110100 |
| DLPAR OPERATIONS 316 | 00110111 |
| LOSS OF POWER 318 | 00111111 |
| SYSTEM MAINTENANCE OPERATIONS 320 | 00000001 |
| INSTALLATION/DEINSTALLATION OF SOFTWARE UPDATES OR PATCHES 322 | 00001011 |
| CRITICAL USER APPLICATIONS 324 | 00000000 |
| DEFAULT FOR ANY ACTIVITY NOT SPECIFIED 326 | 00000000 |

MANAGING POWER SAVINGS IN A HIGH AVAILABILITY SYSTEM AT A REDUNDANT COMPONENT LEVEL OF GRANULARITY

CROSS REFERENCE TO RELATED APPLICATIONS

This application is a continuation of commonly assigned U.S. patent application Ser. No. 14/456,115, filed Aug. 11,2014, which is hereby incorporated herein by reference.

BACKGROUND

1. Technical Field

This invention relates in general to managing power consumption in a high availability system and more particularly to managing power savings in a high availability system at a redundant component level of granularity.

2. Description of the Related Art

In some computing environments, it is critical that the computing environment continue to handle workloads even if one or more resources handling the workloads within the computing environment, fail. For a computing environment to continue to handle workloads, even if one or more resources handling the workloads within the computing environment fail, the computing environment may implement a high availability (HA) system including redundant computers in groups or clusters and a HA controller that provides for automated continued service to workloads when system components within the computer environment fail.

In an HA system, redundant computers include at least one primary node with one set of components and at least one standby or backup node with a backup copy of the set of components in the primary node. To provide high availability to workloads, when system components fail or other conditions in the cluster change, the HA controller detects when the conditions in the cluster change and moves the resource group for a workload to a standby node to continue working. Since failures are unpredictable, in an HA system, the standby node remains powered on, waiting in a failover mode for a failure. Thus, in an HA system, the overall power consumption in a configuration that runs at least one standby node for each primary node, is higher than in a system that is not configured for high availability.

BRIEF SUMMARY

In an HA system, configured with at least one standby node with a set of components that is redundant of the set of components of each primary node, there is a need for a method, system, and computer program product for managing power consumption in the HA system. In addition, there is a need managing power savings in a HA system at a redundant component level of granularity to reduce power consumption without compromising high availability.

In one embodiment, a method for managing power savings in an HA system is directed to selecting, by at least one computer system, based on at least one current activity from among a plurality of detectable activities running on a first selection of components operating in a primary mode from among a plurality of redundant components within a high availability system, a separate power setting for each separate type of redundant component from among a plurality of types of redundant components within the plurality of redundant components as specified in a high availability status specified for the at least one current activity, the high availability status comprising a high availability number comprising a plurality of bits, where each bit of the plurality of bits is specified for a particular separate type of redundant component from among the plurality of types of redundant components, wherein a bit setting of on represents a power setting of off and a bit setting of off represent a power setting of on. The method is directed to selecting, by the at least one computer system, at least one controller interface from among a plurality of controller interfaces according to the bit setting in the high availability number, wherein each separate controller interface from among the plurality of controller interfaces correlates with at least one of the plurality of bits. The method is directed to calling, by the at least one computer system, the at least one controller interface with a request to set the powered state of a particular component that is redundant to at least one of the first selection of components, from among a second selection of components operating in a standby mode from among the plurality of redundant components, to the separate power setting for the separate type of redundant component.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
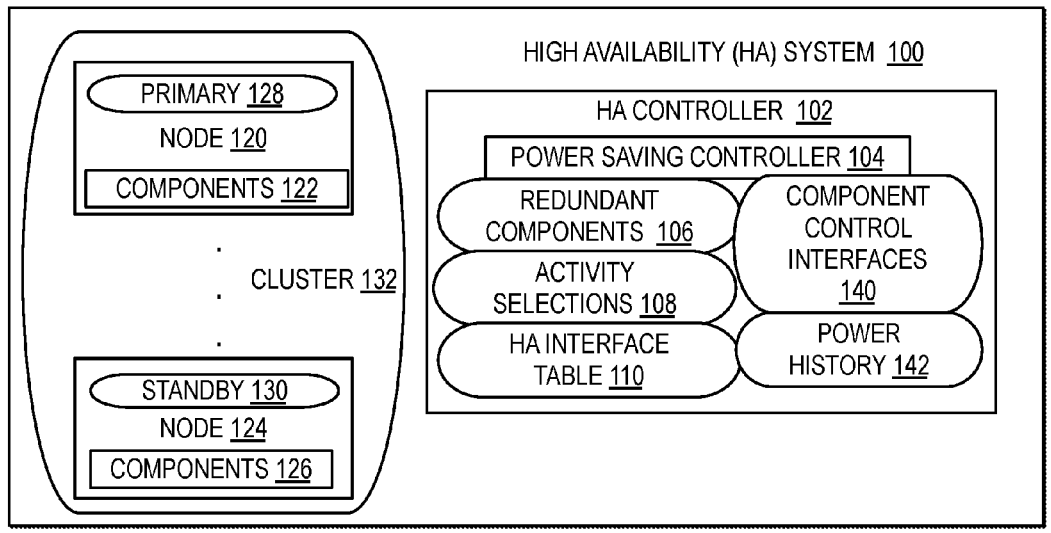
FIG. 1 is a block diagram illustrating one example of a HA availability system in which a HA controller manages power savings at a redundant component level of granularity.

With reference now to the figures, and in particular, with reference now to FIG. 1, a block diagram illustrates one example of a HA availability system in which a HA controller manages power savings at a redundant component level of granularity.

As illustrated in FIG. 1, in one example, a high availability (HA) system 100 represents a system that includes multiple nodes, such as node 120, including a selection of components 122, and a node 124, including a selection of components 126, and one or more high availability controllers, such as HA controller 102. In one example, components 122 and components 126 may include physical and virtual hardware and software components distributed across one or more machines configured within one or more multiple node infrastructures, such as in one or more clusters, such as cluster 132.

In one example, an HA controller 102 manages a configuration of nodes and components within HA system 100 to enable high availability features within HA system 100. High availability features may include, but are not limited to, hardware redundancy for automatic failover of workloads from one node to another node when there is a failure or change of conditions within HA system 100, concurrent repair of faulty hardware within HA system 100, and concurrent upgrade or downgrade of firmware within HA system 100. In one example, HA controller 102 may manage high availability features through controlling redundant power supplies, data synchronization, and continuous monitoring for heartbeats.

In particular, in one example, HA controller 102 may provide high availability features through component redundancies configured within HA system 100. For example, HA system 100 may be configured with all or a selection of components within components 122 redundant to all or a selection of components within components 126. In one example, redundancy may be implemented within HA system 100 through redundancies configured within components 122 and components 126, including, but not limited to, uninterrupted or backup power supplies for components 122 and components 126, running multiple network fibers between each of the components within components 122 and components 126, bonding or load balancing of network cards with components 122 and components 126, using multiple hard drives in a redundant array within components 122 and components 126, and using clusters of central processing units (CPUs) within components 122 and components 126. In the example, if any component of node 120 is not redundant in node 124, that component may become the single point of failure for the whole system. In one example, redundant components 106 includes a configuration of the redundant components within HA system 100, at the component level of granularity.

In one example, HA controller 102 may provide high availability features through managing failovers within HA system 100. In one example, a failover involves the transfer of a workload from a node designated a primary 128, such as node 120, to a node designated as standby 130, such as node 124, in the event of a failure on node 120. When a workload is transferred from node 120 to node 124, node 124, designated as standby 130, is referred to as having taken over the workload of the failed primary system. HA controller 102 may implement one or more strategies for managing failover. In one example, a failover strategy may include an idle standby strategy where the node marked as primary 128 processes all workloads while the node marked as standby 130 is idle, or in standby mode, ready to take over the workloads if there is a failure on the node marked as primary 128. In another example, a failover strategy may include a mutual takeover strategy where there are multiple nodes within HA system 100, and each node is designated as primary 128 for handling a selection of workloads and is also designated as standby 130 for another node, such that when any node fails, the overall performance of HA system 100 may be impacted because the node marked as standby 130 for the failed node continues to handle its selection of workloads as well as the workloads of the failed node. While in the example, node 120 is designated as primary 128 and node 124 is designated as standby 130, in other examples, node 124 may be designated as primary 128 and node 120 may be designated as standby 130. In another example, multiple nodes may be designated as primary 128 and multiple nodes may be designated as standby 130. One of ordinary skill in the art will appreciate that additional or alternate numbers of nodes and additional or alternate designations of nodes as primary 128 and standby 130 may be implemented.

In one example, HA system 100 also provides high availability through clustering. In one example, HA system 100 may configure nodes on one or more clusters, such as cluster 132. Within cluster 132, one or more groups of machines may be connected to work together as one or more single computer systems. In one example, each cluster may implement a cluster management layer for managing the cluster, at the cluster level, and additionally or alternatively, HA controller 102 may implement or supplement a cluster management layer for providing cluster level management within one or more clusters or may communicate with each cluster management layer of each cluster and provide management instructions to one or more cluster management layers. In one example, each cluster may implement liveliness messages sent to and from the machines within each cluster to maintain constant communication between the machines in the cluster, where the lack of a liveliness message sent by a machine indicates the machine has failed. In one example, liveliness messages may be implemented through heartbeat monitoring or keepalive packets sent between machines. In one example, HA controller 102 may fetch liveliness information from each cluster or directly monitor liveliness information from machines within a cluster. If liveliness messages are not detected, cluster 132 or HA controller 102 may automatically management failover to the standby machine.

In one example, for HA controller 102 to manage high availability through redundancy, failover, and clustering, HA controller 102 may maintain each node designated as standby 130 in a powered-on state, even if in a lower power state, waiting for a node marked as primary 128 to fail at any time. In one example, if HA controller 102 implements an idle standby strategy, one or more nodes designated as standby 130 may not be actively working on a workload, but may exchange liveliness messages with other machines within the cluster for liveliness detection, where liveliness message exchanges require power. In addition, in one example, if HA controller 102 implements an idle standby strategy, one or more nodes designated as standby 130 may not be actively working on a workload, but may continue to synchronize data with nodes designated as primary 128 to maintain data synchronization of particular types of data to avoid data loss on a failover, where data synchronization requires power.

In one example, HA system 100 may run node 124 designated as standby 130, however node 120 may not always run critical workloads that require all high availability features. In one example, for HA controller 102 to manage power savings within HA system 100, HA controller 102 may include a power saving controller 104 that determines whether the current activity on one or more primary nodes within HA system 100 includes critical applications, requiring all high availability features, or whether the current activity on one or more primary nodes within HA system 100 is non-critical, and it is not essential to provide all high availability features for the current activity. In one example, activity selections 108 may specify one or more activities for which high availability features are not critical and may also specify one or more activities for which high availability features are critical. In one example, one type of activity which may be specified as not critical within activity selections 108 may include, but is not limited to, administrative types of activity, such as hardware maintenance and installation of certifications. In one example, a system administrator may specify one or more entries within activity selections 108 for all workloads on HA system 100 or specify one or more activity selections 108 on a workload by workload basis, time basis, or other additional criteria. In another example, a user submitting a workload may submit one or more specifications for defining activity and redundancy requirements at a component level of granularity within activity selections 108.

In one example, if power savings controller 104 determines that the current activity on one or more primary nodes within HA system 100 is non-critical, power savings controller 104 may selectively turn off one or more of the redundant components, at a component level of granularity, within the components of a node designated as standby 130. For example, power savings controller 104 may selectively turn off one or more of the redundant components within components 126 of node 124 when it is designated as standby 130. By turning off one or more redundant components within components 126, at a component level of granularity, in a node designated as standby 130, the amount of power consumed to maintain a node designated as standby 130 is reduced, while still providing for high availability as needed within HA system 100. When one or more redundant components are powered off, the one or more redundant components will temporarily no longer maintain data sync, however, when the one or more redundant components are turned back on, the redundant standby component will attempt to resync with the counterpart primary component.

In one example, power savings controller 104 may select to turn on or off one or more components of a node designated as standby 130, at a component level of granularity, by selecting from among one or more components specified as redundant components 106. In one example, redundant components 106 include one or more of the components that are redundant in components 122 and components 126, where for each redundant component, at least one instance of the type of component is included in components 122 and at least one instance of the type of component is included in components 126.

In one example, redundant components 106 may include multiple types of components, with multiples types of interfaces to control the power levels of redundant components 106. In one example, each type of component may implement a separate type of interface to control the power levels of redundant components 106. In another example, multiple components of redundant components 106 may share a same interface or a same type of interface to control the power levels of the components. Power savings controller 104 may selectively turn power on or off at a component level granularity through the one or more interfaces within component control interfaces 140 specified according to component. In particular, in one example, activity selections 108 may specify, for each type of activity detected, one or more bits of a multi-bit HA number, where each bit of the HA number represents a different interface for redundant components 106 and where an HA interface table 110 specifies a separate interface from among component control interfaces 140 with each bit of the multi-bit HA number. In one example, component control interfaces 140 may include, but is not limited to, existing interfaces for turning components on and off and interfaces specified for use by power savings controller 104 for turning components on and off.

In one example, HA controller 102 may enable multiple options of power savings modes that HA system 100 may run in. In one example, HA controller 102 may offer a default mode in which HA controller 102 may attempt to save power during times when HA system 100 is detected as idle. In another example, HA controller 102 may offer a static power mode in which a user may set a cap on the power consumption by one or more servers of HA system 100 and HA controller 102 and HA controller 102 attempts to save power when the power consumption reaches the user defined cap. In another example, HA controller 102 may offer a dynamic power mode in which HA controller 102 monitors workloads and dynamically adjusts the frequency of one or more processors to reduce the power usage of HA system 100. In another example, as illustrated, HA controller 102 may implement a redundant component power state mode through power savings controller 104, where power savings controller 104 monitors for current activity and manages selectively turning on and off redundant components at a component level of granularity within HA system 100 based on whether the current activity is critical or not critical and based on which selection of redundant components is required for the current activity.

In one example, power savings controller 104 may track one or more types of data related to the operations of power saving controller 104 in power history 142. In one example, power savings controller 104 may record the types of detected activities for workloads during a time interval within power history 142. In another example, power savings controller 104 may track records of the dynamic changes to the redundant component settings and any data available regarding power savings as a result of the dynamic changes.

Figure 2:
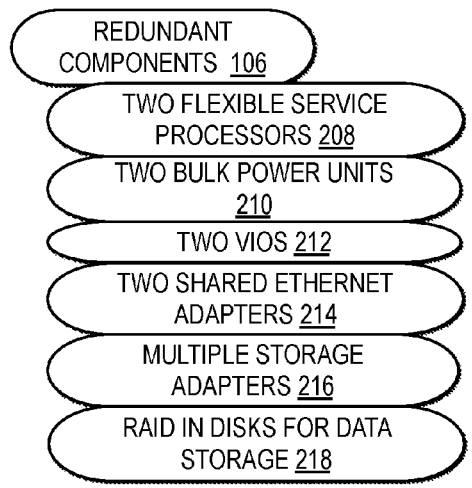
FIG. 2 is a block diagram illustrating one example of a configuration of redundant components for a primary node and a standby node within an HA system.

FIG. 2 illustrates a block diagram of one example of a configuration of redundant components for a primary node and a standby node within an HA system.

In one example, power savings controller 104 may select to turn on or off one or more components of a node designated as standby 130, at a component granularity, by selecting from among one or more components specified as redundant components 106. In one example, a separate instance of redundant components 106 may be specified to reflect the redundant component configuration for each selection of nodes including a node designated as primary 128 and a node designated as standby 130.

In one example, examples of components redundantly configured for a node designated as primary 128 and a node designated as standby 130 in redundant components 106 may include, but are not limited to, two flexible service processors 208, two bulk power units 210, two Virtual Input/Output (I/O) Server (VIOS) 212, two shared Ethernet adapters 214, multiple storage adapters 216, and Redundant Array RAID in Disks for data storage 218. One of ordinary skill in the art will appreciate that additional or alternate configurations of components that are redundant across sets of nodes operating as primary 128 and standby 130 may be implemented within redundant components 106. In addition, one of ordinary skill in the art will appreciate that redundant components 106 may include additional or alternate redundant physical components, redundant virtual components, and redundant shared components.

In one example, in the selection of redundant components specified in redundant components 106, HA system 100 provides redundancy and failover through two flexible service processors 208, one specified in node 120 designated as primary 128 and one specified in node 124 designated as standby 130, and specifies that two flexible service processors 208 should be kept in sync, such that when the service processor within node 120 goes down, the service processor on node 124 takes over the control.

In one example, two redundant VIOS 212 may be configured in a system setup, one VIOS specified in node 120 and one VIOS specified in node 124, to enable shared Ethernet adapter 214 failover, storage area network (SAN) configuration for client root volume groups (rootvgs), and other partition failure management. In one example, each VIOS represents a specialized virtual service partition for providing sharing services for disk and network adapters among one or more client partitions or logical partitions, and which has all the physical I/O resources and allocates physical devices, such as shared Ethernet adapters, storage adapters and disks for data storage. For the client partitions, the devices are virtual devices. Client partitions may share the physical I/O resources. In one example, each VIOS may replace multiple I/O cables with a single cable, such as two shared Ethernet adapter (SEA) 214 for shared transport of all network and storage connections by multiple client partitions, using Internet Protocol (IP) communications, without requiring a physical Ethernet adapter connected to each partition. In the example, if the primary VIOS running on node 120 from VIOS 222 fails, the VIOS client partitions can continue to run because the backup VIOS running on node 124 from VIOS 222 takes control and also provides virtual Ethernet access, through the shared Ethernet adapters running on node 124 from shared Ethernet adapters 214, access to storage, through the storage adapters running on node 124 from multiple storage adapters 216, and disk space, through access to RAID in disks for data storage 218 through the storage adapters.

Figures 3, 4:
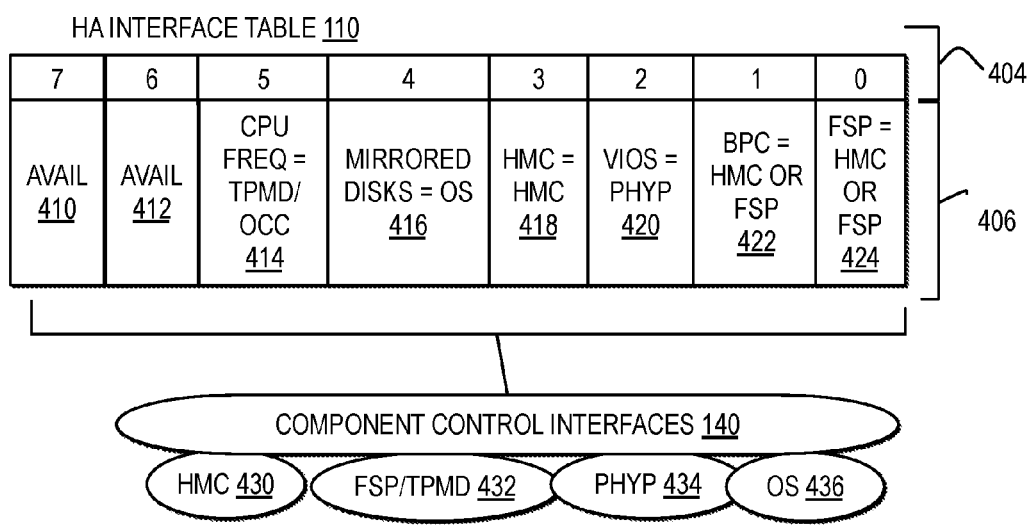
FIG. 3 is a block diagram illustrating one example of selections of activities selected as not high availability critical and as high availability critical.
FIG. 4 is a block diagram illustrating one example of a power saving controller for determining whether current activity in an HA system requires all high availability features and if the current activity in the HA system does not require all high availability features, selectively controls turning off the power to one or more components through one or more component control interfaces at a component level of granularity.

FIG. 3 illustrates a block diagram of one example of selections of activities selected as not high availability critical and as high availability critical.

In one example, HA controller 102 constantly fetches information from HA system 100 about what kind of activity is running on HA system 100. In one example, power saving controller 104 may determine whether current activity running on nodes within HA system 100 includes critical applications that require high availability features, or whether the current activity within HA system 100 is non-critical, and it is not essential to provide all high availability features for the activity, according to activity specifications for HA critical and not HA critical activity in activity selections 108. In one example, activity selections 108 may be specified for multiple sets of primary and standby nodes or a separate instance of activity selections 108 may be specified for a particular selection of nodes designated as primary and standby.

In one example, activity selections 108 may include a selection of activity that is not HA critical and a selection of activity that is HA critical. In one example, during the activities specified as not HA critical, a user may not need all high availability features to be available on node 120 and node 124 since node 120 may not be performing any critical services for end users.

In one example, to distinguish between activities in activity selections 108 which are not HA critical and which are HA critical, each activity may be identified in an activity list 302 and a separate HA number in an HA number list 304 may be assigned to each activity in activity list 302. In one example, an HA number of "00000000" represents an activity that is HA critical, during which all high availability features should be provided. In one example, an HA number other than "00000000" represents an activity that is not HA critical, where the HA number specifies a selection of components, at a component granularity, that may be turned off during the activity.

In one example, activities that may be identified as not HA critical and assigned an HA number other than "00000000" may include, but are not limited to, low priority system admin jobs 310, configuration changes 312, hardware maintenance operations 314, dynamic logical partitioning (DLPAR) operations 316, loss of power 318, system maintenance operations 320, and installation/deinstallation of software updates or patches 322. In one example, low priority system admin jobs 310 may be further specified to one or more low priority tasks including, but not limited to, data backup or migration operations, customization or synchronization tasks, inventory collection, performance benchmarking, or finetuning. Configuration changes 312 may include, but are not limited to, the tasks performed when a system administrator reconfigures one or more machines of HA system 100 for different workloads or applications, during which the current running applications have to be stopped. Hardware maintenance operations 314 may include, but are not limited to, activities where applications that are using hardware that needs to be replaced will have to be stopped before the hardware can be replaced, such as through dynamic replacement, addition, or removal of hardware parts to rectify defective hardware components. DLPAR operations 316 may include, but are not limited to, activities that require non-dynamic relocation (non-DR) aware processes to be stopped on a client partition before performing DLPAR operations, such as an administrator increasing or decreasing the computational resources of a client partition depending on peak load, usage, and productivity demands, where uneven moment of resources can disrupt non-DLPAR aware applications. Loss of power 318 may include, but is not limited to, activities that trigger one or more machines of HA system 100 to operate in a lowest possible power mode to avoid draining backup power supplies before main power is restored, when a backup power supply or uninterruptible power supply (UPS) is activated to provide backup power when a main power supply fails.

In one example, activities that may be identified as HA critical and assigned an HA number of "00000000" may include, but are not limited to, critical user applications 324 and a default for any activity that is not specified within activity 302. In one example, critical user applications 324 may be specified by a type of application or workload or may be specified by a specific identifier marked on a workload by a user or system administrator indicating the workload falls under critical user applications 324. In one example, a system administrator may specify that if multiple types of activity are detected include any activity marked with an HA number of "00000000", the HA number of "00000000" overrides any other HA numbers for other types of activity that may also be present.

FIG. 4 illustrates a block diagram of one example of a power saving controller for determining whether current activity in an HA system requires all high availability features and if the current activity in the HA system does not require all high availability features, selectively controls turning off the power to one or more components through one or more component control interfaces at a component level of granularity.

In one example, power saving controller 104 may include HA interface table 110. In one example, HA interface table 110 includes assignments of a particular control interface for a particular component, as illustrated at reference numeral 406, to each bit of the 8 bit HA number, as illustrated at reference numeral 404. In one example, where the HA number is 8 bits, HA interface table 110 includes 8 columns, with one column for each bit. In one example, an HA number of "00000000" indicates that no high availability features should be turned off.

In one example illustrated at reference numeral 424, the component setting for bit "0" of HA interface table 110 is a flexible service processor (FSP), where one interface that may be called to turn off the FSP is the hardware management console (HMC) interface, such as HMC interface 430. In the example, if the HA number assigned to a particular activity is set to "XXXXXXX1", the assignment indicates that for the current activity, there is not a need for both FSPs, from among two flexible service processors 208, to be up and running, and the standby flexible service processor can be turned off. Power savings controller 104 may make a call to HMC interface 430 to turn off the secondary FSP running on the node designated as standby 130. In one example, once the HA number assigned to the current activity returns to "XXXXXXX0", power savings controller 104 may make a call to HMC interface 430 to turn on the secondary FSP on the node designated as standby 130. In one example, HMC interface 430 provides a standard interface for configuring and operating logically partitioned systems, including providing an interface for managing the powering off and on of one or more FSPs in a particular partition in response to a call to turn off or on the one or more FSPs.

In one example illustrated at reference numeral 422, the component setting for bit "1" of HA interface table 110 is a bulk power controller (BPC) for a bulk power unit. Examples of interfaces that may be called to turn off the BPC is the HMC interface, such as HMC interface 430, or an FSP interface, such as FSP/thermal power management device (TPMD) 432. In one example, the TPMD is a management device for controlling the power used by the processor cores, where power control may include, but is not limited to, managing whether power is supplied to processors and managing the frequencies at which the processor cores operate. In the example, if the HA number assigned to a particular activity is set to "XXXXXX1X", the assignment indicates that for the current activity, there is not a need for both bulk power controllers for two bulk power units 210, to be up and running, and the standby bulk power controller can be turned off. Power savings controller 104 may make a call to HMC interface 430 or to FSP/TPMD 432 to turn off the secondary bulk power controller running on the node designated as standby 130. In one example, once the HA number assigned to the current activity returns to "XXXXXX0X", power savings controller 104 may make a call to HMC interface 430 or to FSP/TPMD 432 turn on the secondary bulk power controller on the node designated as standby 130. In one example, HMC interface 430 provides a standard interface for configuring and operating logically partitioned systems, including providing an interface for managing the powering off and on a bulk power controller in a particular partition in response to a call to turn off or on the bulk power controller.

In one example illustrated at reference numeral 420, the component setting for bit "2" of HA interface table 110 is a VIOS. One example of an interface that may be called to turn off the VIOS is the partition hypervisor (PHYP) interface, such as PHYP 434. In the example, if the HA number assigned to a particular activity is set to "XXXXX1XX", the assignment indicates that for the current activity, there is not a need for both VIOS from among two VIOS 212, to be up and running, and one of the VIOS can be turned off. Power savings controller 104 may make a call to PHYP 434 to turn off one of the VIOS running on the node designated as standby 130. In one example, once the HA number assigned to the current activity returns to "XXXXX0XX", power savings controller 104 may make a call to PHYP 434 to turn on an additional VIOS on the node designated as standby 130. In one example, PHYP 434 provides an interface for managing one or more logical partitions (LPARs) or other virtual layers, and may also refer to a virtual machine monitor for managing virtual machines or other firmware for managing virtual layers.

In one example illustrated at reference numeral 418, the component setting for bit "3" of HA interface table 110 is an HMC. One example of an interface that may be called to turn off the redundant HMC is the HMC interface, such as HMC interface 420. In the example, if the HA number assigned to a particular activity is set to "XXXX1XXX", the assignment indicates that for the current activity, there is not a need for redundant HMC to be running, and the standby HMC can be turned off. Power savings controller 104 may make a call to HMC 420 to turn off the secondary HMC running on the node designated as standby 130. In one example, once the HA number assigned to the current activity returns to "XXXX0XXX", power savings controller 104 may make a call to HMC 420 to turn on the secondary HMC on the node designated as standby 130.

In one example illustrated at reference numeral 416, the component setting for bit "4" of HA interface table 110 is mirrored disks. One example of an interface that may be called to turn off the mirrored disks is the operating system (OS) interface, such as OS 436. In one example, OS 436 may include, but is not limited to, a Unix based operating system. In one example, disk mirroring is commonly used within RAID and is the replication of logical disk volumes onto separate physical hard disks in real time to ensure continuous availability. In HA system 110, RAID in disks for data storage 218 may include, but is not limited to, disk mirroring that includes maintaining replications of logical disk volumes for each of the primary node and for the standby node. In the example, if the HA number assigned to a particular activity is set to "XXX1XXXX", the assignment indicates that for the current activity, there is not a need to keep a mirrored disk up and running for the standby node within RAID in disks for data storage 218, and the standby mirrored disks can be turned off. Power savings controller 104 may make a call to OS 436 to turn off the standby mirrored disks running for the node designated as standby 130. In one example, once the HA number assigned to the current activity returns to "XXX0XXXX", power savings controller 104 may make a call to OS 436 to turn on the mirrored disks for the node designated as standby 130.

In one example illustrated at reference numeral 414, the component setting for bit "5" of HA interface table 110 is CPU frequency. One example of an interface that may be called to adjust the CPU frequency is a frequency control interface, such as FSP/TPMD 432. In the example, if the HA number assigned to a particular activity is set to "XX1XXXXX", the assignment indicates that for the current activity, there is not a need to keep the processor frequencies of all the cores running at the level specified for high availability. Power savings controller 104 may store the current power saving mode defined by a customer or administrator, in a register, and then signal FSP/TPMD 432 to lower the core frequencies of all the processor cores. In one example, once the HA number assigned to the current activity returns to "XX0XXXXX", power savings controller 104 may restore the current power saving mode from the register and signal FSP/TPMD 432 to adjust the power policy of the processor cores to match the required power saving mode. In one example, a customer may specify a power saving mode by specifying one or more frequencies to be applied or may specify rules for selecting frequencies.

In one example, the component settings for bit "7" and bit "6", as illustrated at reference numeral 410 and reference numeral 412, are available for additional components that may be specified with interface assignments.

In the example, referring back to FIG. 3, low priority system admin jobs 310 is assigned an HA number of "00111110". In one example, during the low priority system admin jobs 310, because performance is not a key factor for the low priority tasks, therefore redundant BPCs, redundant VIOS, redundant HMC, and redundant mirrored disks may not be required and CPU frequency on all cores can be reduced to put the system in lower power modes. The HA number of "00111110" includes bit settings for directing power savings controller 104 to call HMC 430 or FSP/TPMD 432 to turn off the standby bulk power controller, to call PHYP 434 to turn off the standby VIOS, to call HMC 430 to turn off the standby HMC, to call OS 436 to turn off the redundant mirrored disks, and to call FSP/TPMD 432 to reduce the processor frequency.

In addition, in the example, referring back to FIG. 3, configuration changes 312 is assigned an HA number of "00100111". In one example, configuration changes 312 may include administrator directed operations to reconfigure the server for different workloads or applications for which current running applications will have to be stopped. During the activity of configuration changes 312, because performance is not a key factor, redundant FSPs, redundant BPCs, and redundant VIOS may not be required and CPU frequency on all cores can be reduced to put the system in lower power modes. The HA number of "00100111" includes bit settings for directing power savings controller 104 to call HMC 430 to turn off the standby FSP, to call HMC 430 or FSP/TPMD 432 to turn off the standby bulk power controller, to call PHYP 434 to turn off the standby VIOS, and to call FSP/TPMD 432 to reduce the processor frequency.

In addition, in the example, referring back to FIG. 3, hardware maintenance operations 314 is assigned an HA number of "00110100". In one example, hardware maintenance operations 314 may include activities where applications that are using hardware that needs to be replaced will have to be stopped before the hardware can be replaced. During the activity of hardware maintenance operations 314, because the applications have to be stopped, redundant VIOS and redundant mirrored disks may not be required and CPU frequency on all cores can be reduced to put the system in lower power modes. The HA number of "00110100" includes bit settings for directing power savings controller 104 to call PHYP 434 to turn off the standby VIOS, to call OS 436 to turn off the redundant mirrored disks, and to call FSP/TPMD 432 to reduce the processor frequency.

In addition, in the example, referring back to FIG. 3, DLPAR operations 316 is assigned an HA number of "00110111". In one example, DLPAR operations 316 may include activities that require non-dynamic relocation (non-DR) aware processes to be stopped on a client partition before performing DLPAR operations. During the activity of DLPAR operations 316, redundant FSPs, redundant BPCs, redundant VIOS, and redundant mirrored disks may not be required and CPU frequency on all cores can be reduced to put the system in lower power modes. The HA number of "00110111" includes bit settings for directing power savings controller 104 to call HMC 430 to turn off the standby FSP, to call HMC 430 or FSP/TPMD 432 to turn off the standby bulk power controller, to call PHYP 434 to turn off the standby VIOS, to call OS 436 to turn off the redundant mirrored disks, and to call FSP/TPMD 432 to reduce the processor frequency.

In addition, in the example, referring back to FIG. 3, loss of power 318 is assigned an HA number of "00111111". In one example, loss of power operations 318 may include activities that trigger one or more machines of HA system 100 to operate in a lowest possible power mode to avoid draining backup power supplies before main power is restored. During the activity of loss of power operations 318, none of the redundant components may be required and CPU frequency on all cores can be reduced to put the system in lower power modes. The HA number of "00111111" includes bit settings for directing power savings controller 104 to call HMC 430 to turn off the standby FSP, to call HMC 430 or FSP/TPMD 432 to turn off the standby bulk power controller, to call PHYP 434 to turn off the standby VIOS, to call HMC 430 to turn off the redundant HMC, to call OS 436 to turn off the redundant mirrored disks, and to call FSP/TPMD 432 to reduce the processor frequency.

In addition, in referring back to FIG. 3, system maintenance operations 320 is assigned an HA number of "00000001". In one example, system maintenance operations 320 may include health checking or system software maintenance operations that will have to be performed during machine runtime, but without applications running. For example, system maintenance operations 320 may include, but are not limited to, adapter diagnostics, media certification tasks, license updates, and microcode changes. When operations need to be performed during machine runtime, but without applications running, both FSPs do not need to be up and running. The HA number of "00000001" includes a bit setting for directing power savings controller 104 to call HMC 430 to turn off the standby FSP.

In addition, in referring back to FIG. 3, installation/deinstallation of software updates or patches 322 is assigned an HA number of "00001011". In one example, installation/deinstallation of software updates or patches 322 may include activities that require stopping software from running in order to install or deinstall software updates. During the activity of installation/deinstallation of software updates or patches 322, redundant FSP, redundant BPC, and redundant HMC may not be required. The HA number of "00001011" includes bit settings for directing power savings controller 104 to call HMC 430 to turn off the standby FSP, to call HMC 430 or FSP/TPMD 432 to turn off the standby bulk power controller, and to call HMC 430 to turn off the redundant HMC.

As illustrated in the example, each of the types of activity that include an HA number with one or more bits set, includes a unique bit setting. The HA number assigned to each type of activity reflects the specified selection of redundant components that can be turned off, as specified for each particular type of activity In additional or alternate embodiments, one or more types of activity may be assigned an HA number with a same bit setting. One of ordinary skill in the art will appreciate that additional or alternate bit settings may be designated for each HA number for each type of activity.

Figure 5:
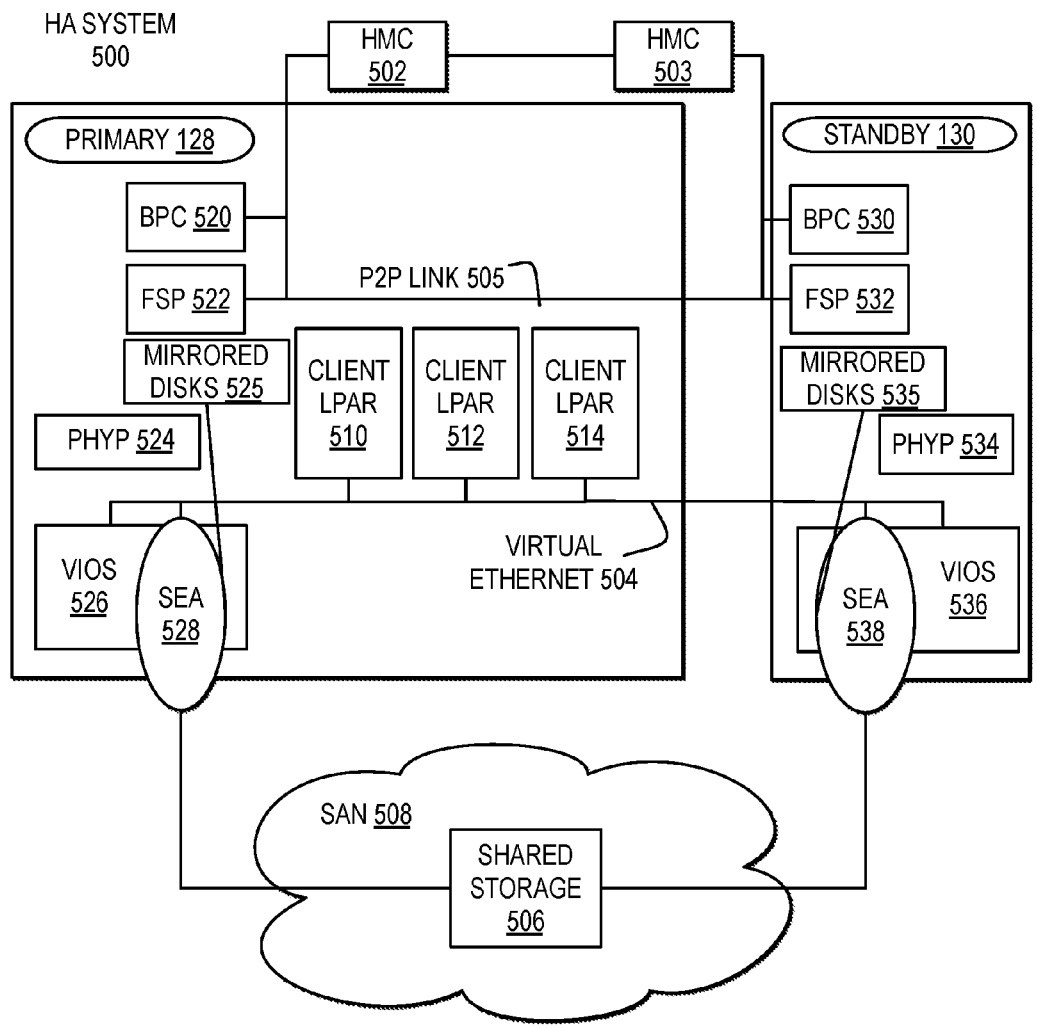
FIG. 5 is a block diagram illustrating one example of a configuration of redundant VIOS and SEA in an HA system.

FIG. 5 illustrates a block diagram of one example of a configuration of redundant VIOS and SEA in an HA system.

In one example, an HA system 500 includes one node illustrated as primary 128 and a another node illustrated as standby 130. In the example, each node includes a virtual management controller layer of firmware, such as a hypervisor 524 and a hypervisor 534. In one example, the virtual management controller layer of firmware illustrated as PHYP 524 and PHYP 534 enables configuring one or more client logical partitions (LPARs), each representing a logical selection of one or more resources. For example, PHYP 524 may enable configuration of client logical partitions of resources, such as client LPAR 510, client LPAR 512, and client LPAR 514. On failover, client LPAR 510, client LPAR 512, and client LPAR 514 may be migrated to standby 130 and managed by PHYP 434.

In addition, through PHYP 524 and PHYP 534, dual VIOS may be configured, illustrated as a VIOS 520 and a VIOS 540. In the example, client LPAR 510, client LPAR 512, and client LPAR 514 may be enabled to communicate with one another without a physical Ethernet adapter by configuring a shared Ethernet adapter (SEA) for each VIOS, illustrated as SEA 522 and SEA 542, and enabling communication between the LPAR and with each VIOS through a virtual Ethernet 504. In one example, each node may connect to a shared area network (SAN) 508 through SEA 528 and SEA 538 through a SAN configuration for client rootvgs to access shared storage 506. In one example, if primary VIOS 526 fails, client LPAR 510, client LPAR 512, and client LPAR 514 continue running because standby VIOS 536 is configured through redundant SEA 538 to provide virtual Ethernet 504 to client LPAR 510, client LPAR 512, and client LPAR 514 and access for each LPAR to shared storage 506. In one example, each node may include mirrored disks in RAID, such as mirrored disks 525 and mirrored disks 535, where the redundant selections of mirrored disks may be connected to shared storage 506 through the redundant VIOS, and where at least one OS running on each node may provide an interface for managing whether mirrored disks 525 and mirrored disks 535 are managed as redundant components of one another.

In one example, HA system includes an HMC 502 for managing components of primary 128 and an HMC 503 for managing components of standby 130, where HMC 502 and HMC 503 are communicatively connected through one or more of a private network and a public network. In one example HMC 502 and HMC 503 manage acquiring network addresses for each node and distributing the network addresses to components within each node. In addition, HMC 502 and HMC 503 may provide additional management of components within each node, including management of FSP 522 by HMC 502 and management of FSP 532 by HMC 503, where the nodes may include redundant FSPs. In one example, redundancy between primary 128 and standby 130 includes maintaining FSP 510 and FSP 530 in sync. In one example, if FSP 510 and FSP 530 are connected via a peer to peer (P2P) link, one FSP may send a signal to the other FSP to turn off or on, and alternatively, one of HMC 502 and HMC 503 may direct FSP 510 and FSP 530 to turn off or on. In addition, the nodes in HA system 500 may include dual BPC, illustrated as BPC 520 and BPC 530, where HMC 502 or FSP 522 may provide an interface to BPC 520 and HMC 503 or FSP 532 may provide an interface to BPC 530. Although not illustrated, each node may include additional interfaces, such as TPMD or OCC interface to each of FSP 510 and FSP 530 for managing the frequency of each FSP at a component granularity.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
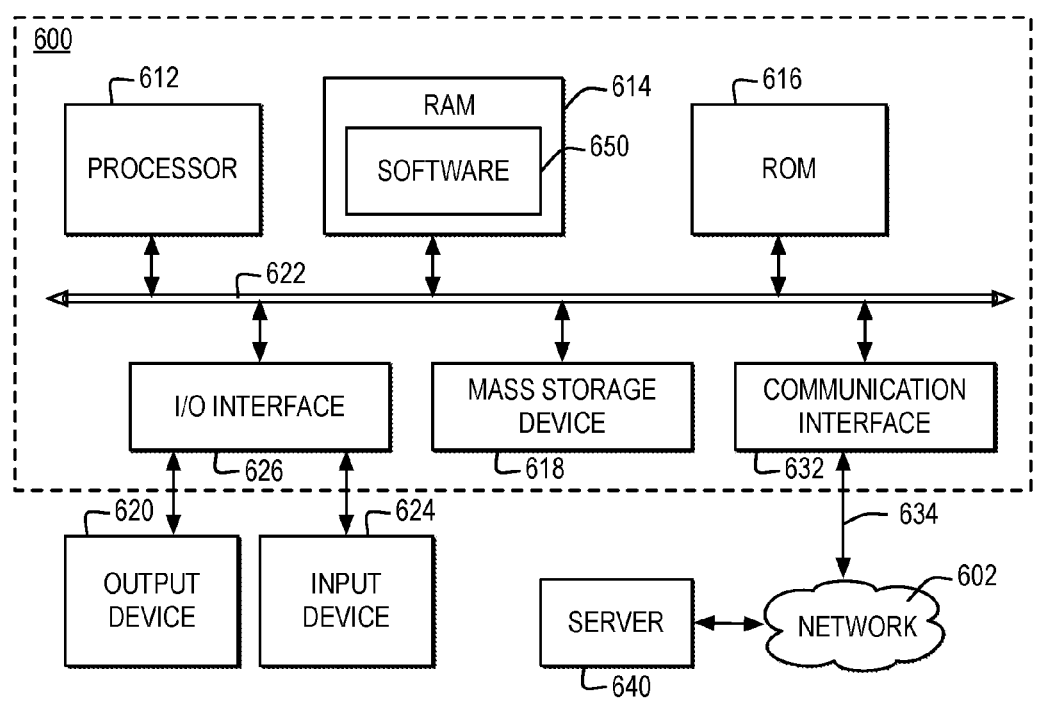
FIG. 6 is a block diagram illustrating one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power. Where multiple processors share bus 622, additional controllers (not depicted) for managing bus access and locks may be implemented.

Processor 612 may be at least one general-purpose processor such as IBM® PowerPC® processor, including one or more cores, that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 may control the operations of flowchart of FIGS. 7-12 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts FIGS. 7-12.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

Figures 7, 8:
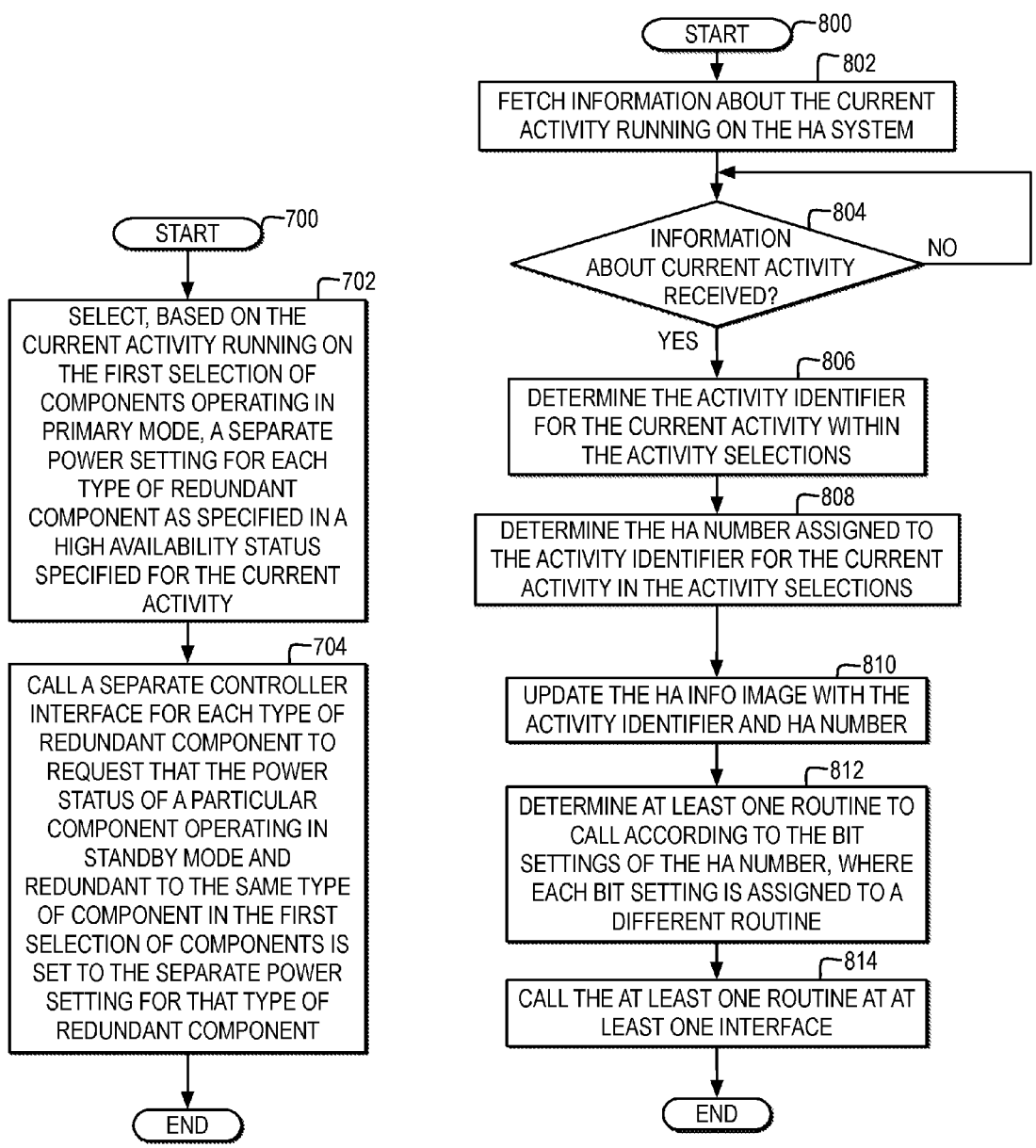
FIG. 7 is a high level logic flowchart of a process and program for dynamically selecting controllers interfaces to call to manage power savings in an HA system at a redundant component level of granularity.
FIG. 8 is a high level logic flowchart of a process and program for managing power savings in an HA system at a redundant component level of granularity.

FIG. 7 illustrates a high level logic flowchart of a process and program for dynamically selecting controllers interfaces to call to manage power savings in an HA system at a redundant component level of granularity. In the example, the process and program starts at block 700 and thereafter proceeds to block 702. Block 702 illustrates selecting, based on the current activity running on the first selection of components operating in primary mode, a separate power setting for each type of redundant component as specified in a high availability status specified for the current activity. Next, block 704 illustrates calling a separate controller interface for each type of redundant component to request that the power status of a particular component operating in standby mode and redundant to the same type of component from among the first selection of components is set to the separate power setting for that type of redundant component, and the process ends.

FIG. 8 illustrates a high level logic flowchart of a process and program for managing power savings in an HA system at a redundant component level of granularity. In the example, the process and program starts at block 800 and thereafter proceeds to block 802. Block 802 illustrates fetching information about the current activity running on the HA system. Next, block 804 illustrates a determination whether information about the current activity on the HA system is received from the fetching. At block 804, if no information about current activity is received, then the process waits at block 804. At block 804, once information about current activity is received, then the process passes to block 806. Block 806 illustrates determining the activity identifier for the current activity within activity selections. Next, block 808 illustrates determining the HA number assigned to the activity identifier for the current activity in the activity selections. Thereafter, block 810 illustrates updating the HA info image with the activity identifier and HA number. Next, block 812 illustrates determining at least one routine to call according to the bit settings of the HA number, where each bit setting is assigned to a different routine. Thereafter, block 814 illustrates calling the selected at least one routine at at least one interface, and the process ends.

Figure 9:
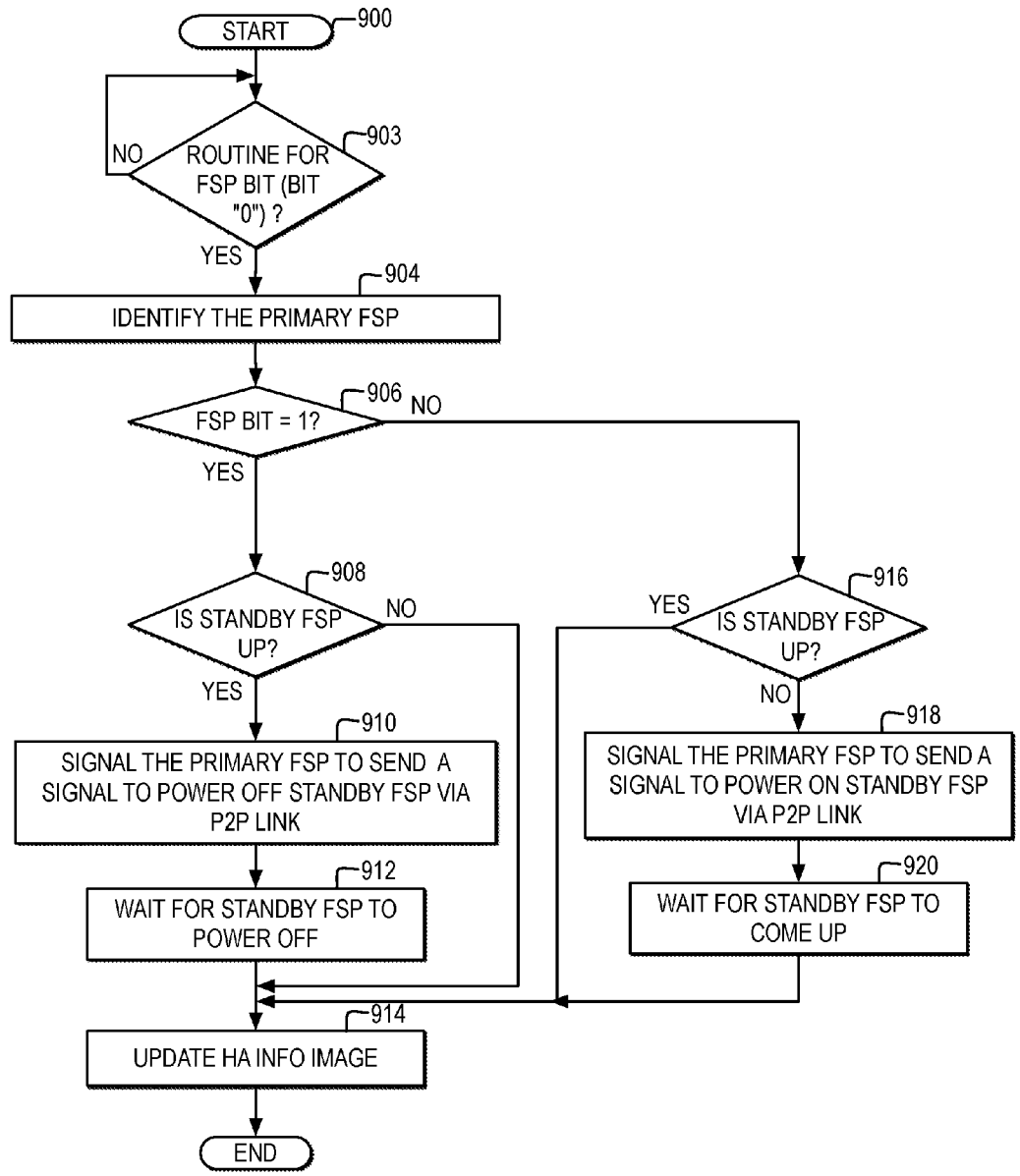
FIG. 9 is a high level logic flowchart of one example of a process and program for calling a routine to manage whether a standby FSP is up or turned off in response to the FSP bit setting in an HA number assigned to current activity.

FIG. 9 illustrates a high level logic flowchart of one example of a process and program for calling a routine to manage whether a standby FSP is up or turned off in response to the FSP bit setting in an HA number assigned to current activity. In the example, the process and program starts at block 900 and thereafter proceeds to block 902. Block 902 illustrates a determination whether a routine for the FSP bit (bit "0") is called. At block 902, if a routine for the FSP bit is called, then the process passes to block 904. Block 904 illustrates identifying the primary FSP. Next, block 906 illustrates a determination whether the FSP bit=1.

At block 906, if the FSP bit=1, then the process passes to block 908. Block 908 illustrates a determination whether a standby FSP is up. At block 908, if a standby FSP is not up, then the process passes to block 914. Block 914 illustrates updating the HA info image to reflect the actions taken or not taken, and the process ends. Returning to block 908, at block 908, if a standby FSP is up, then the process passes to block 910. Block 910 illustrates calling the primary FSP to send a signal to power off the standby FSP via a P2P link between the primary FSP and standby FSP. Next, block 912 illustrates waiting for the standby FSP to power off. In one example, a determination may be made that the standby FSP is powered off through one or more signals including, but not limited to, receiving a specific signal from the primary FSP confirming the standby FSP is powered off or not receiving a response to a heartbeat signal sent to the standby FSP. Thereafter, the process passes to block 914, which illustrates updating the HA info image to reflect the actions taken or not taken, and the process ends.

Figure 10:
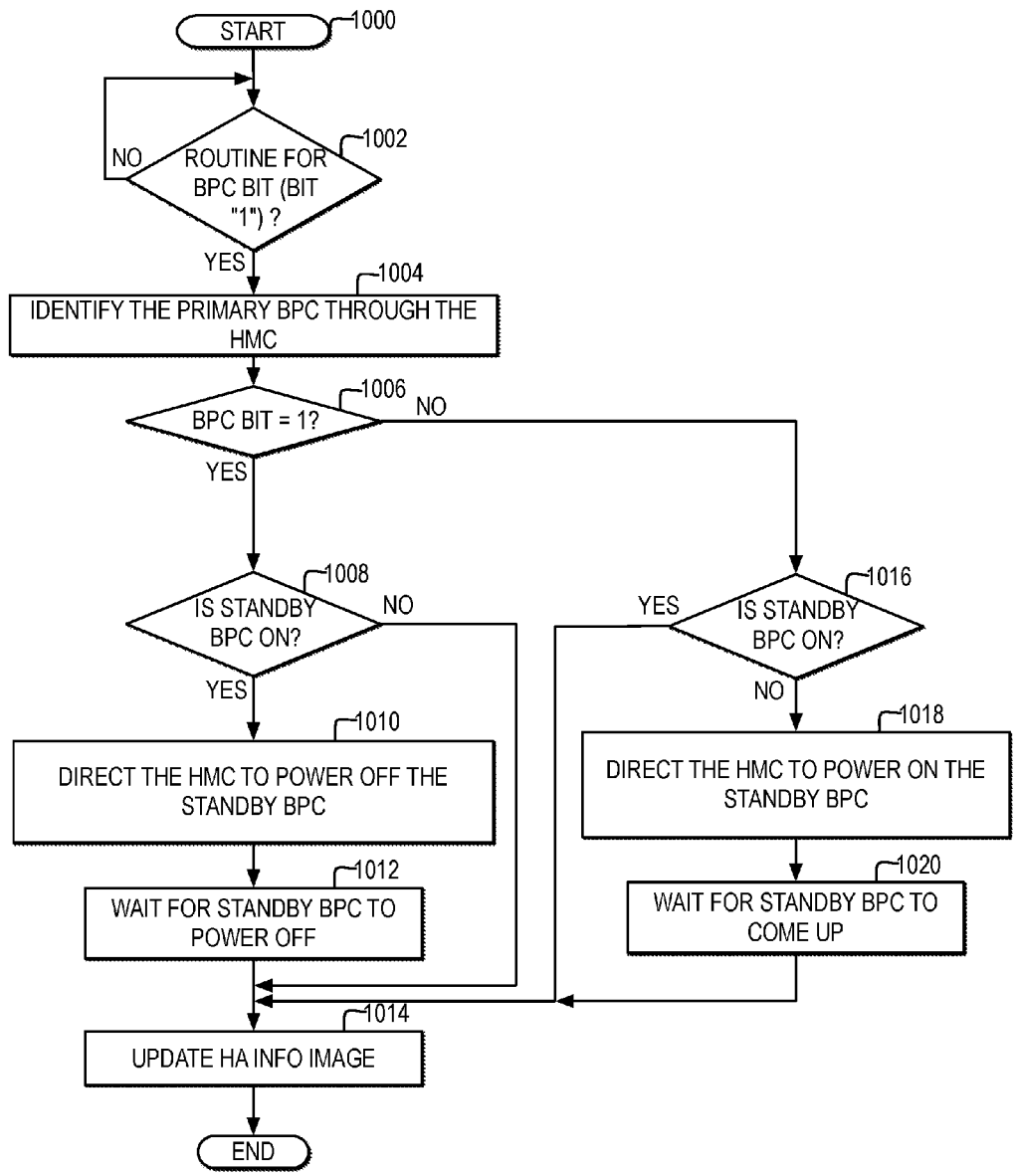
FIG. 10 is a high level logic flowchart of one example of a process and program for calling a routine to manage whether a standby BPC is up or turned off in response to the BPC bit setting in an HA number assigned to current activity.

Returning to block 906, if the FSP bit=0, then the process passes to block 916. Block 916 illustrates a determination whether a standby FSP is up. At block 916, if a standby FSP is up, then the process passes to block 914. At block 916, if a standby FSP is not up, then the process passes to block 918. Block 918 illustrates signaling the primary FSP to send a signal to power on the standby FSP via a P2P link. Next, block 920 illustrates waiting for the standby FSP to come up. In one example, a determination may be made that the standby FSP is powered on through one or more signals including, but not limited to, receiving a specific signal from the primary FSP confirming the standby FSP is powered up or receiving a response to a heartbeat signal sent to the standby FSP. Thereafter, the process passes to block 914, FIG. 10 illustrates a high level logic flowchart of one example of a process and program for calling a routine to manage whether a standby BPC is up or turned off in response to the BPC bit setting in an HA number assigned to current activity. In the example, the process and program starts at block 1000 and thereafter proceeds to block 1002. Block 1002 illustrates a determination whether a routine for the BPC bit (bit "1") is called. At block 1002, if a routine for the BPC bit is called, then the process passes to block 1004. Block 1004 illustrates identifying the primary BPC through the HMC. Next, block 1006 illustrates a determination whether the BPC bit=1.

At block 1006, if the BPC bit=1, then the process passes to block 1008. Block 1008 illustrates a determination whether a standby BPC is on. At block 1008, if a standby BPC is not on, then the process passes to block 1014. Block 1014 illustrates updating the HA info image to reflect the actions taken or not taken, and the process ends. Returning to block 1008, at block 1008, if a standby BPC is on, then the process passes to block 1010. Block 1010 illustrates directing the HMC to power off the standby BPC. Next, block 1012 illustrates waiting for the standby BPC to power off, and the process passes to block 1014. In one example, a determination may be made that the standby BPC is powered off through one or more signals including, but not limited to, receiving a specific signal from the HMC confirming the standby BPC is powered off or not receiving a response to a heartbeat signal sent to the standby BPC. Block 1014 illustrates updating the HA info image to reflect the actions taken or not taken, and the process ends.

Returning to block 1006, if the BPC bit=0, then the process passes to block 1016. Block 1016 illustrates a determination whether a standby BPC is on. At block 1016, if a standby BPC is on, then the process passes to block 1014. At block 1016, if a standby BPC is not on, then the process passes to block 1018. Block 1018 illustrates directing the HMC to power on the standby BPC. Next, block 1020 illustrates waiting for the standby BPC to come up, and the process passes to block 1014. In one example, a determination may be made that the standby BPC is powered on through one or more signals including, but not limited to, receiving a specific signal from the HMC confirming the standby BPC is powered on or receiving a response to a heartbeat signal sent to the standby BPC.

Figure 11:
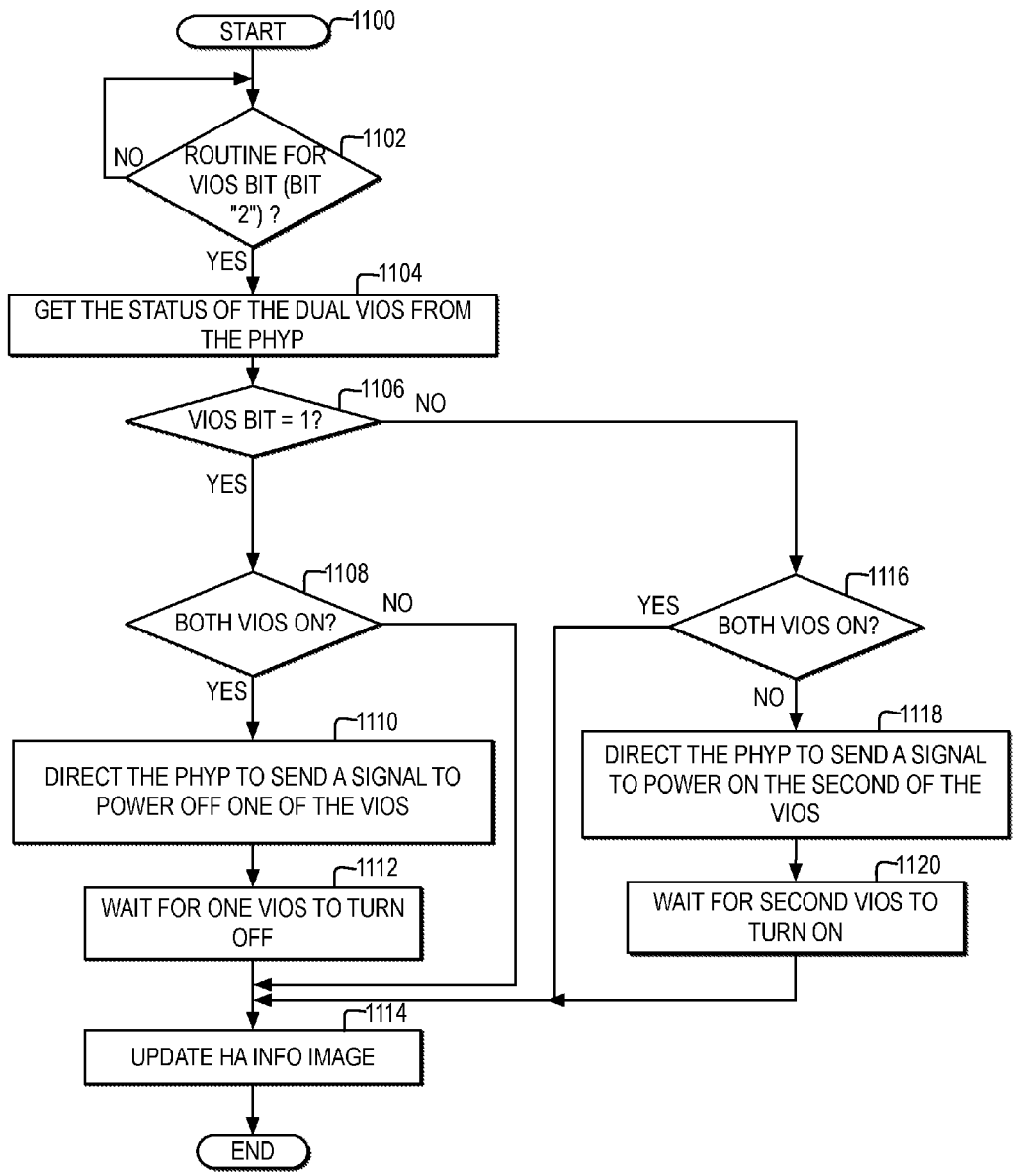
FIG. 11 is a high level logic flowchart of one example of a process and program for calling a routine to manage whether both VIOS of a dual VIOS are turned on in response to the VIOS bit setting in an HA number assigned to current activity.

FIG. 11 illustrates a high level logic flowchart of one example of a process and program for calling a routine to manage whether both VIOS of a dual VIOS are turned on in response to the VIOS bit setting in an HA number assigned to current activity. In the example, the process and program starts at block 1100 and thereafter proceeds to block 1102. Block 1102 illustrates a determination whether a routine for the VIOS bit (bit "2") is called. At block 1102, if a routine for the VIOS bit is called, then the process passes to block 1104. Block 1104 illustrates getting the status of the dual VIOS from the PHYP. Next, block 1106 illustrates a determination whether the VIOS bit=1.

At block 1106, if the VIOS bit=1, then the process passes to block 1108. Block 1108 illustrates a determination both VIOS are on. At block 1108, if both VIOS are not on, then the process passes to block 1114. Block 1114 illustrates updating the HA info image to reflect the actions taken or not taken, and the process ends. Returning to block 1108, at block 1108, if both VIOS are on, then the process passes to block 1110. Block 1110 illustrates directing the PHYP to send a signal to power off one of the VIOS. Next, block 1112 illustrates waiting for the standby VIOS to turn off, and the process passes to block 1114. In one example, a determination may be made that one of the VIOS is powered off through one or more signals including, but not limited to, receiving a specific response from the PHYP confirming that one of the VIOS has been turned off. Block 1114 illustrates updating the HA info image to reflect the actions taken or not taken, and the process ends.

Returning to block 1106, if the VIOS bit=0, then the process passes to block 1116. Block 1116 illustrates a determination whether both VIOS are on. At block 1116, if both VIOS are on, then the process passes to block 1114. At block 1116, if both VIOS are not on, then the process passes to block 1118. Block 1118 illustrates directing the PHYP to send a signal to power on the second of the VIOS. Next, block 1120 illustrates waiting for the second VIOS to turn on, and the process passes to block 1114.

Figure 12:
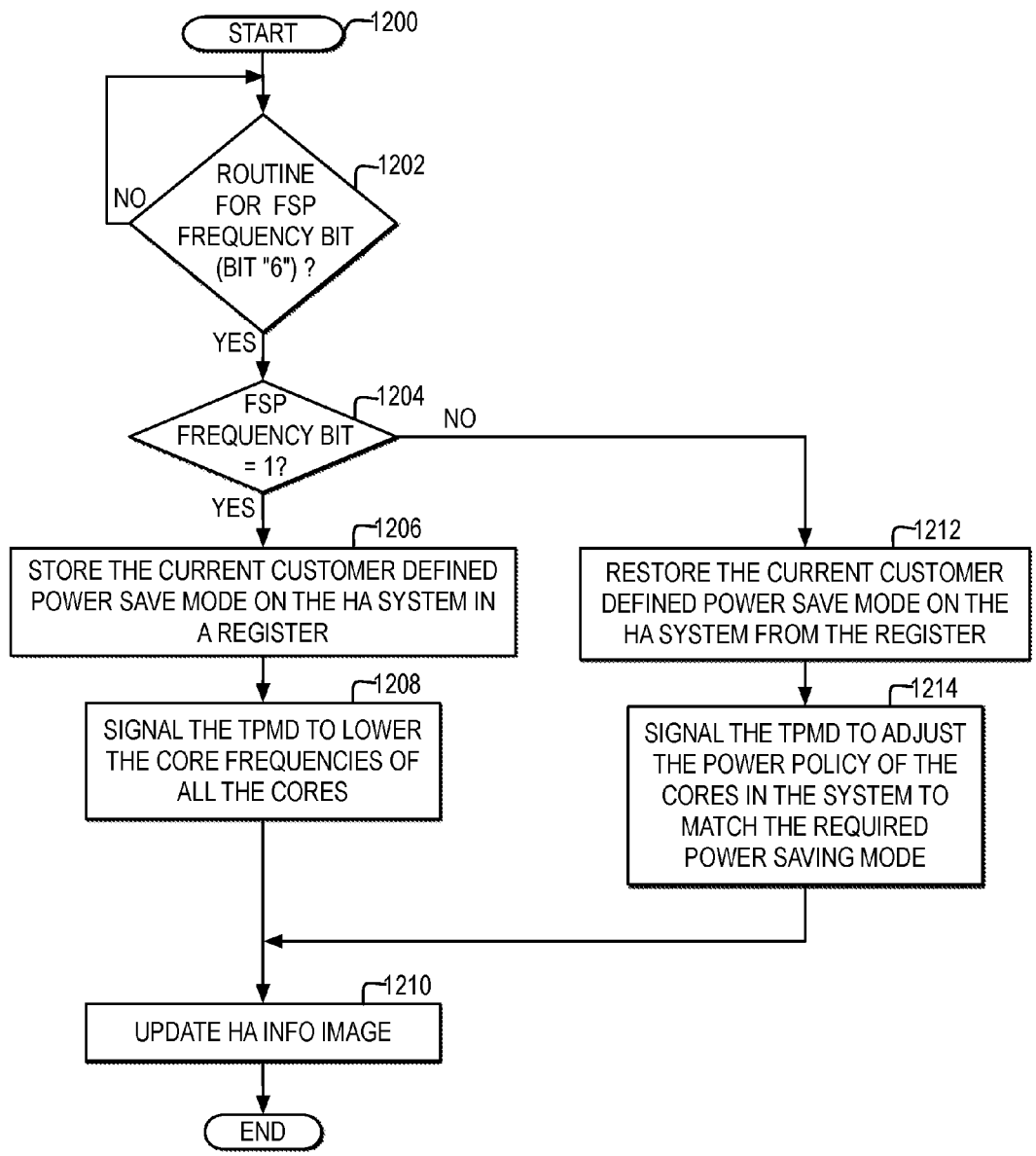
FIG. 12 is a high level logic flowchart of one example of a process and program for calling a routine to manage a frequency setting for the cores in the HA system according to the FSP frequency bit setting in an HA number assigned to current activity.

FIG. 12 illustrates a high level logic flowchart of one example of a process and program for calling a routine to manage a frequency setting for the cores in the HA system according to the FSP frequency bit setting in an HA number assigned to current activity. In the example, the process and program starts at block 1200 and thereafter proceeds to block 1202. Block 1202 illustrates a determination whether a routine for the FSP frequency bit (bit "6") is called. At block 1202, if a routine for the FSP frequency bit is called, then the process passes to block 1204. Block 1204 illustrates a determination whether the FSP frequency bit=1.

At block 1204, if the FSP frequency bit=1, then the process passes to block 1206. Block 1206 illustrates storing the current customer defined power save mode on the HA system in a register, where the current customer defined power save mode may specify one or more static frequencies for a TPMD to apply for one or more power save modes implemented by the TMPD or one or more criteria or rules for a TPMD to apply in determining what frequency to operate the processor cores at. Next, block 1208 illustrates signaling the TPMD to lower the core frequencies of all the cores in the HA system. Thereafter, block 1210 illustrates updating the HA info image to reflect the actions taken or not taken, and the process ends.

At block 1204, if the FSP frequency bit=0, then the process passes to block 1212. Block 1212 illustrates restoring the current customer defined power save mode on the HA system from the register. Next, block 1214 illustrates signaling the TPMD to adjust the power policy of the cores in the system to match the required power savings mode, and the process passes to block 1210.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing power savings in a high availability system, comprising:
    selecting, by at least one computer system, based on at least one current activity from among a plurality of detectable activities running on a first selection of components operating in a primary mode from among a plurality of redundant components within a high availability system, a separate power setting for each separate type of redundant component from among a plurality of types of redundant components within the plurality of redundant components as specified in a high availability status specified for the at least one current activity, the high availability status comprising a high availability number comprising a plurality of bits, where each bit of the plurality of bits is specified for a particular separate type of redundant component from among the plurality of types of redundant components, wherein a bit setting of on represents a power setting of off and a bit setting of off represent a power setting of on;
    selecting, by the at least one computer system, at least one controller interface from among a plurality of controller interfaces according to the bit setting in the high availability number, wherein each separate controller interface from among the plurality of controller interfaces correlates with at least one of the plurality of bits; and
    calling, by the at least one computer system, the at least one controller interface with a request to set the powered state of a particular component that is redundant to at least one of the first selection of components, from among a second selection of components operating in a standby mode from among the plurality of redundant components, to the separate power setting for the separate type of redundant component.

2. The method according to claim 1, wherein selecting, by at least one computer system, based on at least one current activity from among a plurality of detectable activities running on a first selection of components operating in a primary mode from among a plurality of redundant components within a high availability system, a separate power setting for each separate type of redundant component from among a plurality of types of redundant components within the plurality of redundant components as specified in a high availability status specified for the at least one current activity, further comprises:
    fetching, by the at least one computer system, information about the at least one current activity running on the first selection of components in the high availability system;
    selecting, by the at least one computer system, an activity identifier specified for the information about the at least one current activity from among a plurality of activity identifiers each specified for a separate type of the plurality of detectable activities; and
    determining, by the at least one computer system, the high availability status specified for the at least one current activity by selecting the high availability status specified for the activity identifier from among a plurality of high availability status assigned to the plurality of activity identifiers.

3. The method according to claim 1, further comprising:
    responsive to selecting the high availability status comprising a particular bit specified for the particular separate type of redundant component comprising a redundant flexible service processor, identifying, by the at least one computer system, a primary flexible service processor operating in the primary mode from among a plurality of flexible service processors in the plurality of components;
    determining, by the at least one computer system, whether the particular bit is set on;
    responsive to determining the particular bit is set on, if a standby flexible service processor operating in the standby mode from among the plurality of flexible service processors is set to a powered state of powered on, selecting, by the at least one computer system, to signal the primary flexible service processor to power off the standby flexible service processor via a peer to peer link connecting the standby flexible service processor to the primary flexible service processor and waiting for a heartbeat indicator to indicate the standby flexible service processor is not responding; and responsive to determining the particular bit is not set on, if the standby flexible service processor is set to a powered state of not powered on, selecting, by the at least one computer system, to signal the primary flexible service processor operating in the primary mode to power on the standby flexible service processor via the peer to peer link connecting the standby flexible service processor to the primary flexible service processor and waiting for the heartbeat indicator to indicate the standby flexible service processor is responding.

4. The method according to claim 1, further comprising:

responsive to selecting the high availability status comprising a particular bit specified for the particular separate type of redundant component comprising a redundant bulk power controller, identifying, by the at least one computer system, a primary bulk power controller operating in the primary mode from among a plurality of bulk power controllers in the plurality of components from a query to a hardware management console, wherein each of the plurality of block power controllers manage the power to one or more additional components of the plurality of components;

determining, by the at least one computer system, whether the particular bit is set on;

responsive to determining the particular bit is set on, if a standby bulk power controller operating in the standby mode from among the plurality of bulk power controllers is set to a powered state of powered on, selecting, by the at least one computer system, to direct the hardware management console to power off the standby bulk power controller and waiting for the hardware management console to indicate the standby bulk power controller is not responding; and responsive to determining the particular bit is not set on, if the standby bulk power controller is set to a powered state of not powered on, selecting, by the at least one computer system, to direct the hardware management console to power on the standby bulk power controller and waiting for the hardware management console to indicate the standby bulk power controller is responding.

5. The method according to claim 1, further comprising:

responsive to selecting the high availability status comprising a particular bit specified for the particular separate type of redundant component comprising a redundant virtual internet operating system (VIOS), accessing, by the at least one computer system, a status of a dual VIOS comprising at least two instances of a VIOS from a partition hypervisor for managing at virtual machines, where each of the VIOS comprises a virtual service partition for providing sharing services for disk and network adapters from among the plurality of components among one or more client partitions;

determining, by the at least one computer system, whether the particular bit is set on;

responsive to determining the particular bit is set on, if the status of the dual VIOS indicates the at least two instances of the VIOS are both on, selecting, by the at least one computer system, to direct the partition hypervisor to send a signal to power off one of the at least two instances of the VIOS and waiting for the partition hypervisor to signal that one of the at least two instances of the VIOS is powered off; and responsive to determining the particular bit is not set on, if the status of the dual VIOS indicates the at least two instances of the VIOS are not both on, selecting, by the at least one computer system, to direct the partition hypervisor to send a signal to power on an additional VIOS from among the at least two instances of the VIOS and waiting for the partition hypervisor to signal that the additional VIOS of the at least two instances of the VIOS is powered on.

6. The method according to claim 1, further comprising:

responsive to selecting the high availability status comprising a particular bit specified for the particular separate type of redundant component comprising a redundant processor frequency, determining, by the at least one computer system, whether the particular bit is set on;

responsive to determining the particular bit is set on, storing, by the at least one computer system, a current power save mode in a register and selecting to signal a thermal power management device (TPMD) to apply a power policy of lowering a core frequency of a plurality of processor cores of the plurality of components, wherein the thermal power management device applies the power policy to manage the core frequency of the plurality of processor cores; and responsive to determining the particular bit is not set on, restoring, by the at least one computer system, the current power save mode from the register and selecting to signal a TPMD to apply a power policy restored to the register to adjust the core frequency of the plurality of processor cores according to the current power save mode.

\* \* \* \* \*